United States Patent
Radermacher et al.

(10) Patent No.: US 10,122,545 B2
(45) Date of Patent: Nov. 6, 2018

(54) POWER FORWARDING VIA A POWERED DEVICE

(71) Applicant: PHILIPS LIGHTING HOLDING B.V., Eindhoven (NL)

(72) Inventors: Harald Josef Günther Radermacher, Eindhoven (NL); Matthias Wendt, Eindhoven (NL); Dave Willem Van Good, Eindhoven (NL); Lennart Yseboodt, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 102 days.

(21) Appl. No.: 15/502,411

(22) PCT Filed: Jun. 30, 2015

(86) PCT No.: PCT/EP2015/064869
§ 371 (c)(1),
(2) Date: Feb. 7, 2017

(87) PCT Pub. No.: WO2016/020122
PCT Pub. Date: Feb. 11, 2016

(65) Prior Publication Data
US 2017/0237580 A1    Aug. 17, 2017

(30) Foreign Application Priority Data

Aug. 8, 2014 (EP) .................................. 14180295

(51) Int. Cl.
*H04L 12/40* (2006.01)
*H04L 12/10* (2006.01)
(Continued)

(52) U.S. Cl.
CPC ........ *H04L 12/40045* (2013.01); *H04L 12/10* (2013.01); *H04L 12/2838* (2013.01); *H05B 37/0263* (2013.01)

(58) Field of Classification Search
CPC .............. H04L 12/40045; H04L 12/10; H04L 12/2838; H05B 37/0263
See application file for complete search history.

(56) References Cited

U.S. PATENT DOCUMENTS 8,247,927 B2 * 8/2012 Togawa .................. H04B 3/44
307/112
2006/0100799 A1 * 5/2006 Karam ...................... G06F 1/26
702/57

(Continued)

FOREIGN PATENT DOCUMENTS

EP    2228943 A1    9/2010
EP    2701338 A1    2/2014
(Continued)

*Primary Examiner* — Jared Fureman
*Assistant Examiner* — Michael Warmflash

(57) ABSTRACT

The present invention relates to a powered device (331a, 331b, 531a) with two interfacing connections. The powered device (331a, 331b, 531a) comprises power switching units (350a, 350b, 550$a_1$, 550$a_2$) for forwarding the data signal as well the power received on the input to the output. Forwarding may be based on a detection of the powering state of the PD. In another embodiment, the Power-over-Ethernet input/output ports function bi-directionally, thereby allowing the user to daisy-chain devices in any direction. As power switching units, relays or solid-state power switches may be used.

14 Claims, 7 Drawing Sheets

(51) Int. Cl.
*H04L 12/28* (2006.01)
*H05B 37/02* (2006.01)

(56) References Cited

U.S. PATENT DOCUMENTS

| | | |
|---|---|---|
| 2006/0177192 A1 | 8/2006 | Jonnala et al. |
| 2006/0273661 A1 | 12/2006 | Toebes et al. |
| 2009/0235093 A1 | 9/2009 | Diab et al. |
| 2013/0031378 A1 | 1/2013 | Schindler et al. |
| 2013/0144448 A1 | 6/2013 | Luerkens et al. |
| 2016/0191256 A1* | 6/2016 | Wendt .................. H04L 12/10 713/300 |

FOREIGN PATENT DOCUMENTS

| | | |
|---|---|---|
| JP | 2006094013 A | 4/2006 |
| JP | 2006203730 A | 8/2006 |
| JP | 2006222722 A | 8/2006 |
| JP | 2010213068 A | 9/2010 |

* cited by examiner

POWER FORWARDING VIA A POWERED DEVICE

CROSS-REFERENCE TO PRIOR APPLICATIONS

This application is the U.S. National Phase application under 35 U.S.C. § 371 of International Application No. PCT/EP2015/064869, filed on Jun. 30, 2015, which claims the benefit of European Patent Application No. 14180295.9, filed on Aug. 8, 2014. These applications are hereby incorporated by reference herein.

FIELD OF THE INVENTION

The invention relates to a powered device, a Power-over-Ethernet network system, a method of power forwarding via a powered device, and a computer program product.

BACKGROUND OF THE INVENTION

Power-over-Ethernet (PoE) is a standard to supply power to detached data equipment and peripherals (like routers, switches, printer spoolers etc.) through the same wire or network connection that is already used to connect these to the Ethernet. Currently, discussions are coming up to make use of the same standard for all kinds of low power loads such as, e.g., lighting equipment (sensors, switches, light sources etc.) or entertainment appliances like active speakers, internet radios, DVD player, set-top boxes and even TV sets. Here, actual standardization in IEEE802.3 is going on to support power levels even up to 100 W per Cat5/6 connection.

One upcoming field for applying PoE is in lighting systems. The new generation of LED based lamps makes use of a central power supply as provided by PoE in the network infrastructure. In addition, the use of cheap network cables reduces installation costs and inherent safety (due to low DC power) and polarity independence reduces installation errors which, if they occur during installation, can be identified immediately, because power does not need to be shut off as in conventional lighting installations directly connected to mains. Typically, load devices are light sources. However, other devices like sensors or user interface devices (switches, control panels) may also be powered by PoE.

As PoE supply systems for power distribution inside of buildings get into the view of the industry, some specific usage aspects of these networks need to find solutions in order to get these direct current powered networks (so called "DC-Grids") widely employed. When the PoE standard was introduced for supplying power to detached networking devices like routers, switches, printer spoolers, etc., it was a replacement for small power-plug type power supplies, since the originally intended loads where mostly already equipped with communication and processing means.

FIG. 1A shows a typical connection of a conventional PoE system comprising a power sourcing equipment (PSE) 1 and one PoE load 20 usually called a powered device (PD). A connection may be implemented by means of a so called patch cable 14 between one of a plurality of output jacks or ports 12, 13 of the PSE 1 and an input jack or port 21 of the PD 20. In PoE systems, typically power supplies 11, 24 and data connectivity of data processing functions 19, 25 are sharing the same patch cable 14. In multi-load systems, each load is connected to a separate one of the plurality of output ports consisting of first port (P1) 12 to n-th port (Pn) 13 of PSE 1, while PSE manager 18 takes care of the correct powering. So each load, such as PD 2, indicates separately the suitability for receiving power over the Ethernet connection and negotiates separately the availability of required power with PSE 1. This requires a powered device controller 23 in each load (i.e. PD 20). On the PSE side, PSE management controller 18 supervises the negotiations on all ports.

However, in the new application field of lighting systems or similar load systems with often small loads with low local computing and communication requirements, sometimes the overhead of communication and processing compared to the load complexity is inappropriate. Moreover, another shortcoming of PoE is its purely star-based network topology, while lighting systems are often wired in a serial manner (i.e. daisy-chained). Due to this, implementation of the star-based PoE in these kinds of typically serially connected load systems would lead to increased total cable lengths and thick cable bundles in comparison with a truly serially connected implementation.

A conventional PoE lighting system 100 with a PoE switch 110 (being supplied via mains connection 111) and a number of luminaires 132, 133, 134, 135 connected thereto by means of Ethernet connections 121, . . . , 125 is shown in FIG. 1B. A typical luminaire 132, 133, 134, 135 in a conventional PoE lighting system 100 comprises lighting modules (such as, e.g., LEDs) generating light and an electronic section, controlling the LED current. The luminaire further comprises an interface (exemplary indicated by reference sign 135a for luminaire 135) to the PoE connection for negotiation and voltage adaptation.

US 2006/100799 A1 discloses a method and apparatus for managing an Inline Power relationship between and among a first network device acting as power sourcing equipment to provide Inline Power to a second Powered Device and a third device. In one aspect of the invention, the powered device(s) and the third device are powered (at least in part) by the PSE using inline power from at least one port (which may include more than one PSE) and they are powered over one or more sets of cables.

SUMMARY OF THE INVENTION

It is an object of the present invention to implement simpler PoE-powered devices, systems, and methods for a serial load system at reduced connection requirements.

In a first aspect of the invention, there is provided a powered device for use in a Power-over-Ethernet network where power is supplied through network connections, said powered device comprising: a first port; a second port; and a power switching unit configured to enable power forwarding via said second port in a first mode, and to disable power forwarding via said second port in a second mode.

The present invention proposes to equip at least one node with two Ethernet sockets. In one embodiment, there is an input socket and an output socket. In another embodiment, both sockets may act as either input socket or output socket so that the wiring direction is irrelevant. Both embodiments are of course possible. The proposed chain configuration or daisy-chaining leads to a reduced total cable length and average thickness of the cable bundle. The proposed circuitry preferably takes care of obeying the negotiation rules employed for said PoE system. The proposed circuitry further preferably takes care of forwarding power to the output port. The present invention thus provides a system with smart PoE chaining. Preferably, the cable connections allow building chains, where, e.g., the sensors get wired to a chain with corresponding luminaires. Chain sequence information is preferably used for commissioning, power forwarding and internal power management. Preferably, the system comprises a powered device with at least two interfacing connections (e.g. RJ45 jacks), comprising a PD interface (e.g. realized with an integrated PD controller chip), a detector, for detection the powering state of the PD, and power switching elements for forwarding a power signal received on one interface (such as, e.g., the input port) towards the other interface (such as, e.g., the output port). Preferably, forwarding is actuated depending on the detected powering state of the PD.

In a preferred embodiment, said power switching unit is configured to enable power forwarding only after said powered device is fully powered. By enabling power forwarding only after said powered device is fully powered, the preferred embodiment provides for a more robust PoE environment. That is, due to the delay in each stage, the powered devices get activated one by one, hence avoiding a huge incrush current of multiple devices.

In a further preferred embodiment, said powered device is configured to detect whether the first port receives power from a second powered device based on whether said first port receives power without prior power negotiation. In a further preferred embodiment, said powered device is configured increase its power consumption with a slew rate that is lower than or equal to a predefined maximal slew rate if said powered device detects that the first port receives power from a second powered device. A first powered device arranged down the chain from a second powered device (i.e., the first powered device is coupled to a power sourcing equipment of said Power-over-Ethernet network not directly, but only via the second powered device) is preferably able to detect that it is chained, because said first powered device receives power without prior negotiation. This information is useful because the first powered device can thus ramp up its power consumption slowly, preferably in small steps so as to avoid overpowering of the powered device. Thereby, the system sequentially powers up in an efficient manner from the first device being connected to the power source equipment directly. In a further option, the power switching unit may be adapted to deactivate the output port if it determines that the remaining power amount is not enough. This ensures that sufficient power is always provided to subsequent load devices.

In a further preferred embodiment, said first and second ports each comprise at least one RJ45 connector. By choosing RJ45 connectors as ports, it is made clear that power is forwarded via the RJ45 connectors and not via some other interface means.

In a further preferred embodiment, said first port is configured to receive power from a power sourcing equipment or from a preceding PD with similar functionality, wherein said second port is configured to forward power to a subsequent powered device for use in said Power-over-Ethernet network. By configuring said first port to receive power from a PSE or from a preceding PD with similar functionality, and by configuring said second port to forward power to a subsequent powered device in a PoE network, a daisy-chained PoE network is implemented. As a consequence, as noted above, a smaller amount of cabling is needed.

In a further preferred embodiment, said powered device is configured to obey negotiation rules employed for said Power-over-Ethernet network. By configuring the powered device to obey negotiation rules for a PoE network, such as, e.g., standards IEEE 802.3af and IEEE 802.3at, the powered device according to the preferred embodiment is made compatible with standard-compatibly installed networks.

In a further preferred embodiment, said powered device comprises an integrated powered device control unit. The powered device control unit may take care of the negotiation, classification, and/or current limiting. Said functionality may also be built by discrete components and/or standard integrated circuits (such as, e.g., operational amplifiers, digital logic integrated circuits, etc.). In particular, the powered device control unit may be the controller chip.

In a further preferred embodiment, said powered device comprises a switching unit of a T-switch type. The T-Switch handles the data communication, enabling the first and the second PD (and further Ethernet data sink or source downstream) to share the upstream data connection. A "T-Switch" is sometimes also called a "3-port switch". It allows splitting off one data connection and letting one connection run through. Consequently, the wiring may be represented graphically by a "T".

In a further preferred embodiment, said first port is configured to receive power via four pairs of a cable from a group comprising category 5 cables and category 6 cables. By configuring the first port to receive power via four pairs of a cable from a group comprising category 5 cables and category 6 cables, the present embodiment provides a unidirectional solution where the first port corresponds to an input port and the second port corresponds to an output port.

In a further preferred embodiment, said powered device comprises first and second power bypass units, wherein said first power bypass unit is passive, and wherein said second power bypass unit comprises said power switching unit. By having said first power bypass passive and second power bypass unit comprising said power switching unit, still the power flow to the downstream PD can be controlled, but only one switch is needed. In fact, since at least one signal needs to be switched, at least one switch is needed. Of course, it is also possible to switch both signals.

In a further preferred embodiment, said first port is configured to receive power via two pairs of a cable from a group comprising category 5 cables and category 6 cables, and wherein said second port is configured to receive power via two pairs of an Ethernet cable. In a further preferred embodiment, said powered device comprises first and second power bypass units, wherein said first power bypass unit comprises said power switching unit, and wherein said second power bypass unit comprises a second power switching unit.

In a further preferred embodiment, said power switching unit comprises a Single Pole Single Throw relay unit and/or a Double Pole Single Throw relay unit, and/or wherein said power switching unit comprises a solid state switch, and/or wherein said solid state switch comprises a MOSFET. For controlling these switching elements, level shifting means or isolation means, such as opto couplers, pulse transformers or capacitive coupling may be used.

In a second aspect of the invention, there is provided a Power-over-Ethernet network system, where power is supplied through network connections, said Power-over-Ethernet network system comprising: a power sourcing equipment; first and second powered devices, wherein said first and second power devices are powered devices according to the first aspect, wherein an output of said power sourcing equipment is coupled to said first port of said first powered device, and wherein said second port of said first powered device is coupled to said first port of said second powered device.

In a preferred embodiment, said Power-over-Ethernet network system comprises a detector for detection a powering state of first powered device.

In a further preferred embodiment, said first powered device is configured to forward power to said second powered device based on said powering state.

In a third aspect of the invention, there is provided a method of power forwarding via a powered device in a Power-over-Ethernet network where power is supplied through network connections, said method comprising: receiving power via a first port of said powered device; in a first mode, enabling power forwarding via a second port of said powered device; and in a second mode, disabling power forwarding via said second port.

In a fourth aspect of the invention, there is provided a computer program product comprising code means for producing the steps of the method of the third aspect when run on a computer device.

It shall be understood that the powered device of claim 1, the Power-over-Ethernet network system of claim 11, the method of power forwarding via a powered device of claim 14, and the computer program product of claim 15 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

The present invention proposes equipping at least one node with two Ethernet sockets. (The end node of a chain obviously does not require two ports.) One socket is preferably acting as an input port. Another socket is preferably acting as an output port. The proposed circuitry preferably takes care for obeying the negotiation rules employed for the PoE system. The proposed circuitry further preferably takes care of forwarding power to the output port.

Figure 1A:
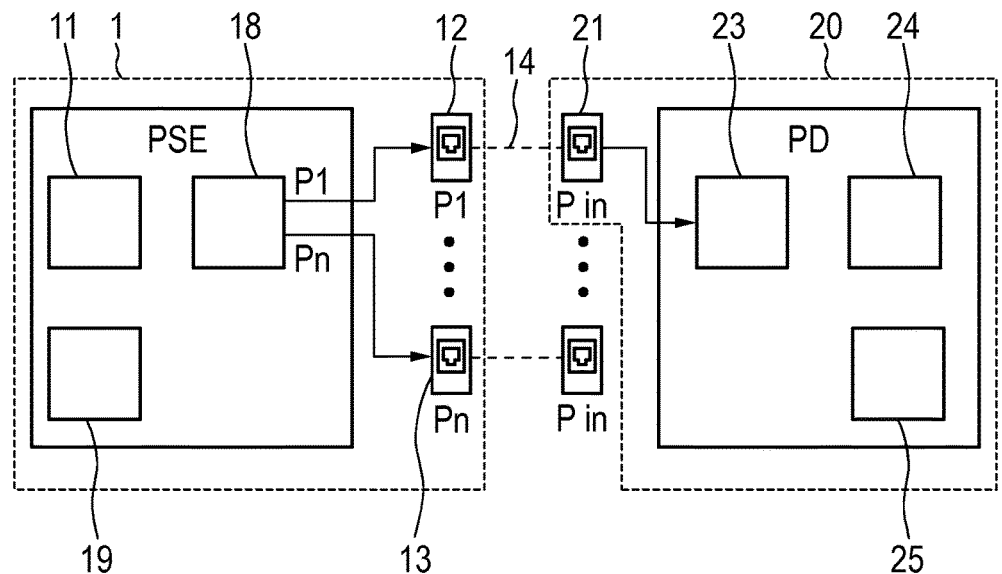
FIG. 1A shows a typical connection of a conventional PoE system.
Figure 1B:
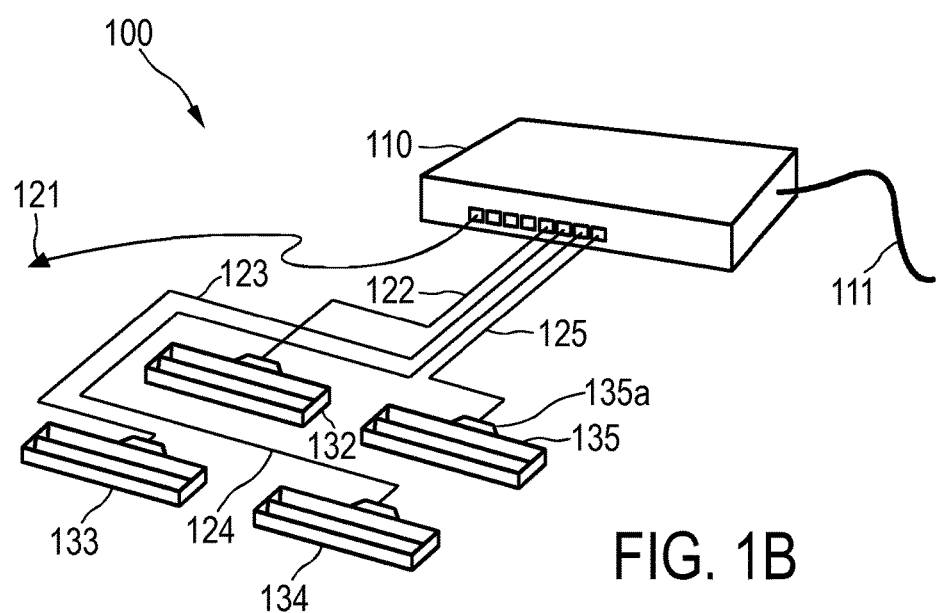
FIG. 1B shows a conventional PoE lighting system.
Figure 2:
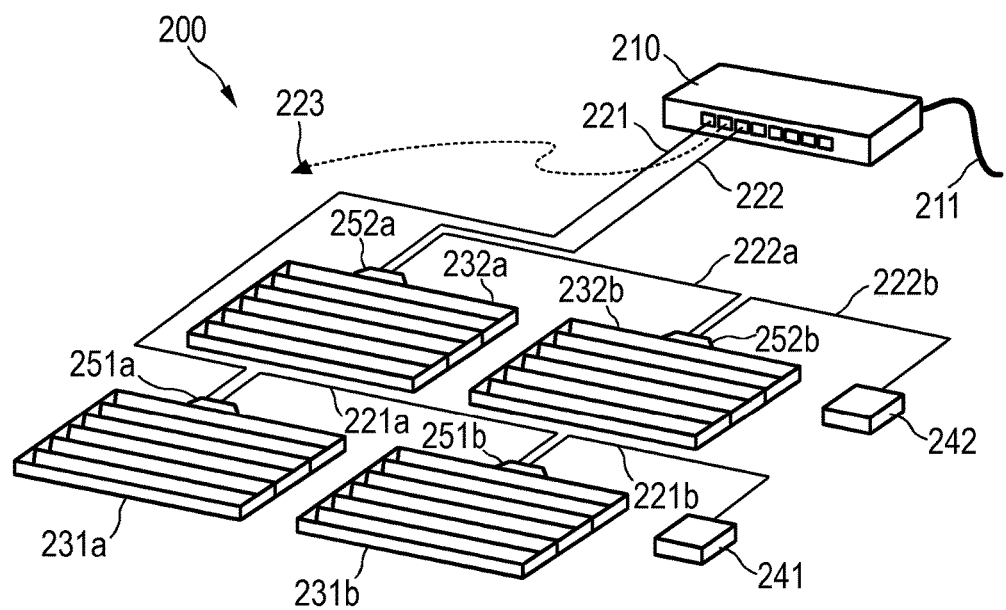
FIG. 2 shows an embodiment of a PoE lighting system.

FIG. 2 shows the general structure of an embodiment of the present invention. Namely, there is shown a system 200 with smart PoE chaining.

The required cable connections 221, 221a, 221b, 222, 222a, 222b allow building chains, where, e.g., sensors 241, 242 get wired in a chain with luminaires 231a, 231b and 232a, 232b, respectively. Chain sequence information is preferably used for commissioning.

System 200 preferably comprises a PD 231a with at least two interfacing connections (such as, e.g., RJ45 jacks) coupled to lines 221 and 221a. PD 231a preferably comprises a PD interface 251a (which may be realized, e.g., with an integrated PD controller chip). System 200 further comprises detectors, such as, e.g., sensing nodes 241, 242, for detecting a powering state of PDs 231a, 231b and 232a, 232b, respectively, and power switching elements for forwarding the power signal received on one interfacing connection (such as, e.g., the input port) towards the other interfacing connection (such as, e.g., the output port), where the forwarding is actuated depending on the detected powering state of PDs 231a, 231b, 232a, 232b.

Figure 3:
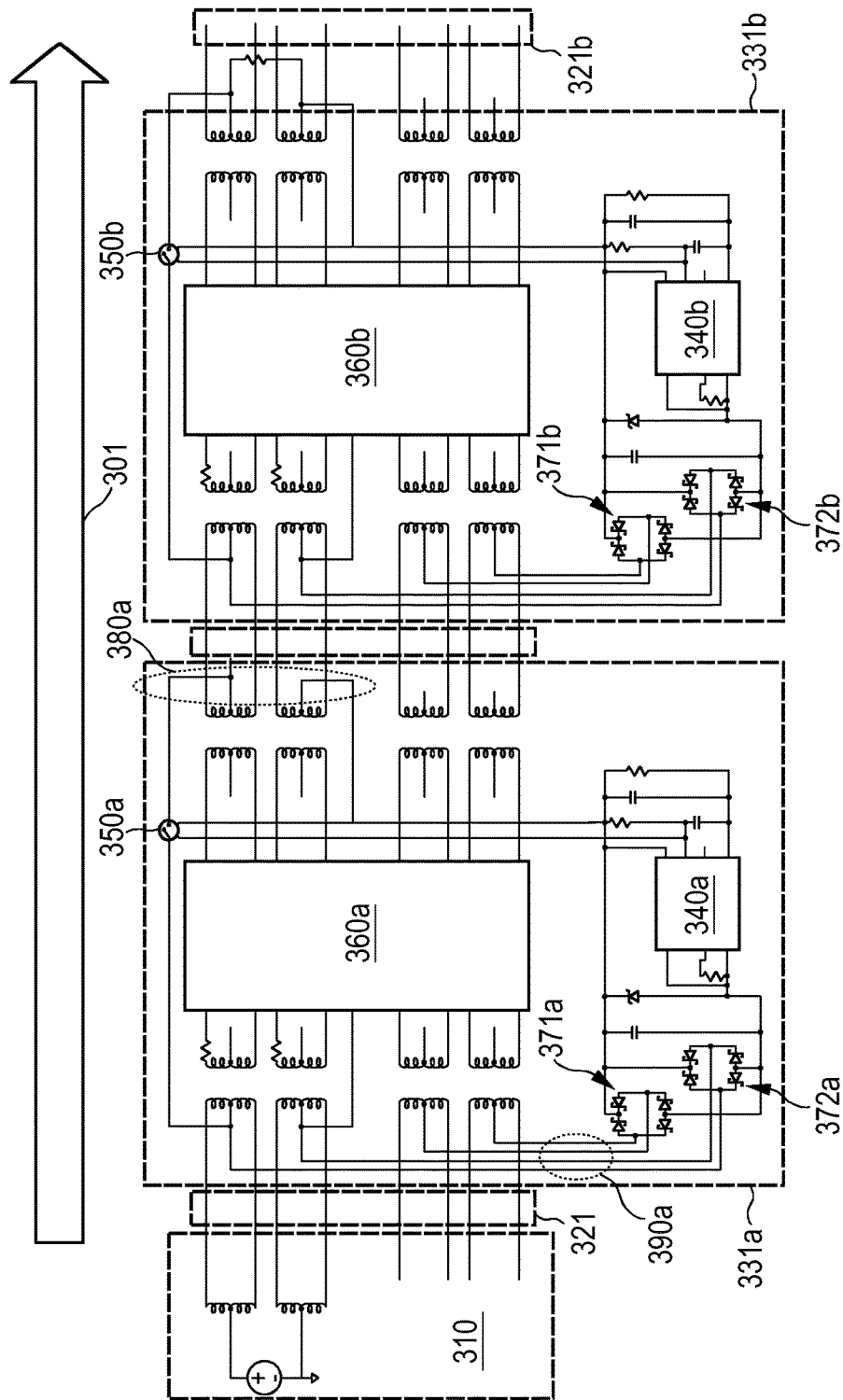
FIG. 3 shows an embodiment of a system comprising a unidirectional switched power bus.

An exemplary embodiment of a daisy-chained PoE network system 300 is illustrated by FIG. 3. FIG. 3 shows a system 300 comprising a unidirectional switched power bus, where the energy flow direction is indicated by arrow 301. In other words, system 300 requires a fixed wiring sequence. Functionality and operation of system 300 will be described in combination with the waveforms from a simulation result shown in FIG. 4.

Powered device 331a preferably comprises a T-switch 360a (i.e., a data switch that manages the data flow amount three ports, one being the first port of the powered device, one being the second port of the powered device, and one being the internal data sink and source of the powered device) for handling the data flow. However, it is noted that for the powering aspect, T-switch 360a is not relevant. T-switch 360a is thus optional. In the embodiment shown in FIG. 3, reference sign 380a further indicates that PD 331a comprises one passive (solid line) and one switched (dashed line) bypass unit.

Figure 4:
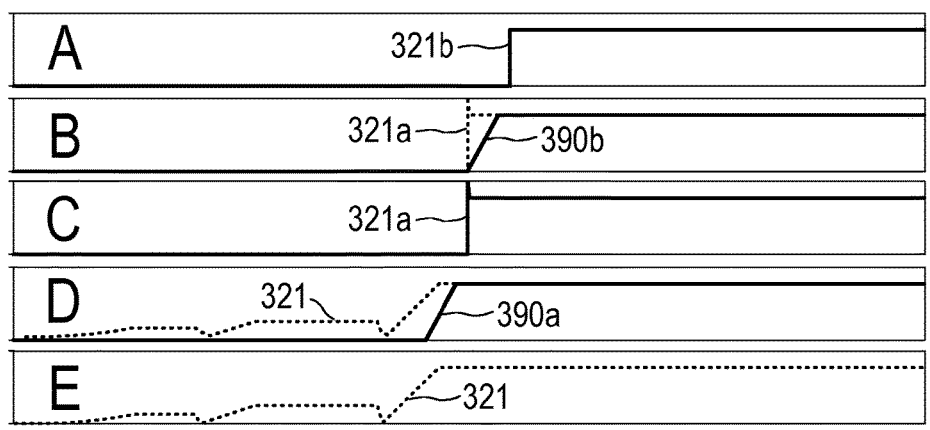
FIG. 4 shows simulations of voltage waveforms illustrating the operation of the system of FIG. 3.

PD 331a receives power via all four pairs of line 321 on one side (i.e., the input side) of PD 331a. PD 331a preferably comprises a PoE power interface, made up by two full bridge rectifiers 371a, 372a receiving the input voltage via internal lines 390a. The rectified output voltage is given to a PD controller chip 340a. PD controller chip 340a is an example of an integrated circuit providing a powered device control unit. PD controller chip 340a loads the rectified output voltage with appropriate signals for detection and classification, in accordance with the PoE standard. PD controller chip 340a preferably negotiates at least once for the highest possible power class. Preferably, negotiating for the highest possible power class is done regardless of PD 331a's own power consumption. Detection and classification is illustrated in panels E and D of FIG. 4. The output voltage of PSE 310 to line 321 is shown in panel E of FIG. 4. The rectified input from line 321 as well as the internal load voltage 390a (output by PD controller chip 340a) to the LED driver of PD 331a are shown in panel D of FIG. 4. During negotiation and classification, internal load voltage 390a is basically zero, followed by a ramp up. During operation, it is the rectified input minus the voltage drop of the switch inside PD controller chip 340a. In FIG. 4, for simplicity, output voltage of PSE 310 to line 321 in panel E of FIG. 4 and the rectified input from line 321 in panel D of FIG. 4 are both denoted by reference sign "321". In fact, both waveforms are closely related, but not necessarily equal. That is, the output voltage of PSE 310 minus the voltage drop in the cable, transformer and rectification unit 372 corresponds to the rectified input. After PD 331a has ramped up its internal power supply, the correct connection to PSE 310 via line 321 is detected by PD controller chip

340*a*. Preferably, PD controller chip 340*a* generates a "power good"-signal. Then, a power switching unit 350*a* in PD 331*a* is closed. Closing power switching unit 350*a* results in forwarding the input voltage from line 321 to the second interface connection (such as, e.g., the output port) coupled to line 321*a*, as shown in panel C of FIG. 4.

The voltage forwarded via the output port of PD 331*a* to line 321*a* is received by the downstream powered device 331*b*, as depicted by the dashed curve 321*a* in panel B of FIG. 4. Elements 3xxb of PD 331*b* correspond to like-numbered elements 3xxa of PD 331*a*. Skipping the detection and classification cycle, PD 331*b* can start ramping up its own power supply, as depicted in the solid curve 390*b* in panel B of FIG. 4.

Next, the powering state of PD 331*b* is detected as being connected to PSE 310. Due to the missing negotiation and classification cycle, this connection can be detected to be established via PD 331*a*. Subsequently, PD 331*b* may forward its received input signal to its second interface connection (such as, e.g., to its output port) via line 321*b*, as shown by waveform 321*b* in panel A of FIG. 4. Further loads may be connected here, and will act in accordance with the first and second loads (i.e., PD 331*a* and PD 331*b*).

This solution supports standards IEEE 802.3af and IEEE 802.3at with only main pairs chained through. As the power switching unit 350*a* (such as, e.g., a transmission gate switch) is deactivated as long as the PD power is not established, the right-hand chained devices 331*b* will never get the identification/negotiation voltages and hence cannot interfere with the identification/negotiation procedure.

Powered devices down the line only see their respective input voltage stepping up to the nominal voltage of PSE 310 and will thus not consider negotiation, but simply activate the output power. Therefore, the rest of the chain follows with very low delay once PD 331*a* has finished negotiation and established the power forwarding via activating switch 350*a*. Due to the low but existing delay in each stage, the PDs 331*b*, etc. get activated one by one. Hence, an inrush current of multiple devices is avoided.

PD controller chips 340*a*, 340*b*, . . . of chain elements 331*a*, 331*b*, . . . preferably request maximum power in negotiation. In the case that the added elements actually consume more than the negotiated power would allow for, PSE 310 will remove power due to over-current detection. Hence, no harmful situation (such as, e.g., cable overheating) can occur.

PD 331*b* can detect that it is chained, because it receives power without prior negotiation. This is useful information for ramping up the power consumption of PD 331*b* slowly.

Beneficial features involve a good compatibility, because the last PD in the chain can be every compatible PD, which takes power even without prior negotiation. Switch 350*a* for chaining is not necessarily a transmission gate. This is because, in system 300, power flow is one-directional. Chain position may be detected, e.g., by means of the serialized T-switches 360*a*, 360*b*. In particular, a first chain element (such as PD 331*a* in system 300) may take the power from both pairs of the patch cable. Limiting characteristics of the above-described one-directional solution of system 300 involve the issue that the input and output ports of every chain element (such as, e.g., PDs 331*a*, 331*b*) must be correctly wired. Further, some legacy PDs, which would negotiate for lower voltage, might get surprised by the full voltage level, as it is not foreseen for these elements to negotiate at all.

For solving the first limitation, correct or false wiring direction might be indicated to the installer or user, e.g., by optical and or acoustical means signaling that a wiring has been installed incorrectly.

Figure 5:
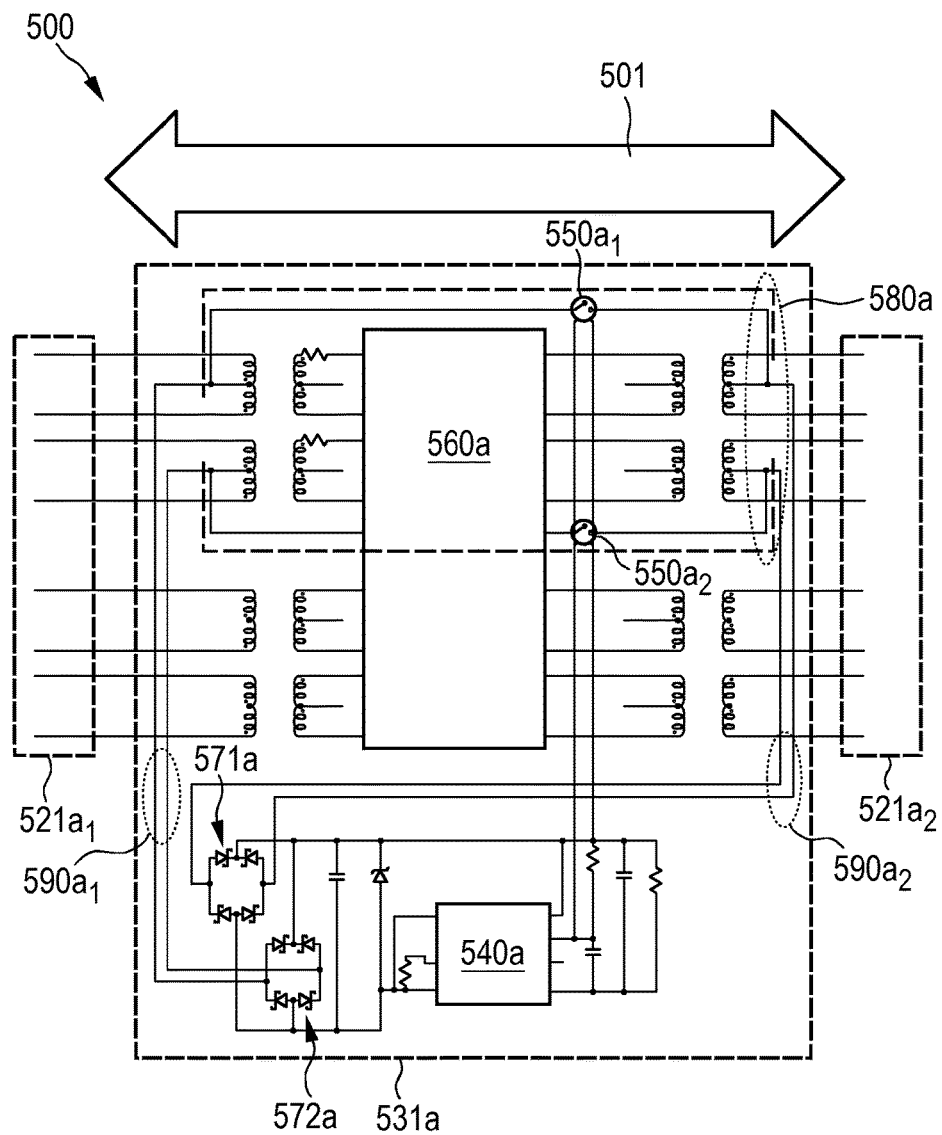
FIG. 5 shows another embodiment of a system with a bidirectional power routing alternative.

A second embodiment is shown and described in FIG. 5 showing a system 500 with a bidirectional power routing alternative indicated by arrow 501, which may be referred to as a "switched power bus". Arrow 501 highlights the bidirectional energy flow direction which allows for a flexible wiring sequence.

In system 500, input and output ports may be used vice versa allowing for an error-free installation. In addition, using the input and output ports interchangeably offers the possibility to power PD 531*a* from two sides via lines $521a_1$ and $521a_2$. The switched bidirectional solution is described in more detail in the following.

Characteristics of the first solution (i.e., the switched unidirectional bus) essentially remain. Elements 5xx of system 500 correspond to like-numbered elements 3xx of system 300. However, in the switched bidirectional solution, power is accepted from either side via line $521a_1$ or via line $521a_2$.

As a mere design choice, two power switching units $550a_1$ and $550a_2$ are used in system 500, in contrast to the single power switching unit 350*a* of system 300. Thus, in the embodiment shown in FIG. 5, reference sign 580*a* indicates that PD 531*a* comprises two switched power bypass units. It is further noted that any number of power switching units between one and four is conceivable in system 500.

It is noted that, when using additional rectifier bridges, all four pairs, IEEE 802.3af and IEEE 802.3at, and main/aux, may be used on either side. That is, as indicated by reference signs $590a_1$ and $590a_2$, power may be input via two pairs on each side of PD 531*a*. In addition, the last chain element can be any PD, which is configured to accept non-negotiated power.

In contrast to the first embodiment, in the switched bidirectional solution, the two bridge rectifiers are not assigned to all pairs on one side, but are assigned to the "main" pairs on both sides. Consequently, powering may be applied from either side, rendering the connection sequence irrelevant. The detection and switching action is just like the one described with reference to FIGS. 3 and 4.

Figure 6:
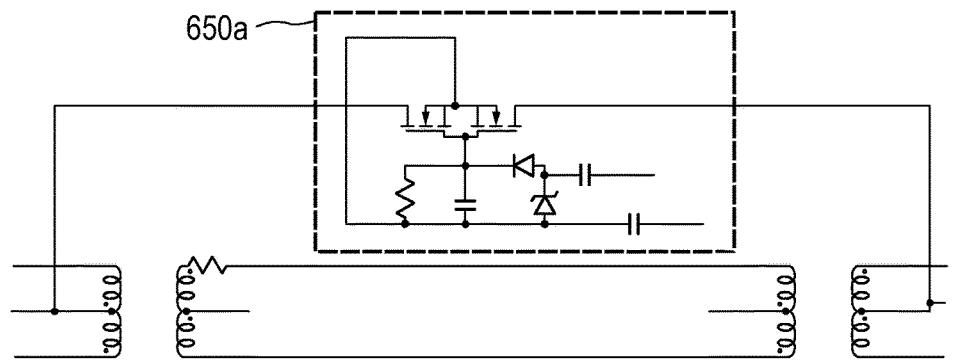
FIG. 6 shows an embodiment of a solid-state power switching unit with capacitive coupling.
Figure 7:
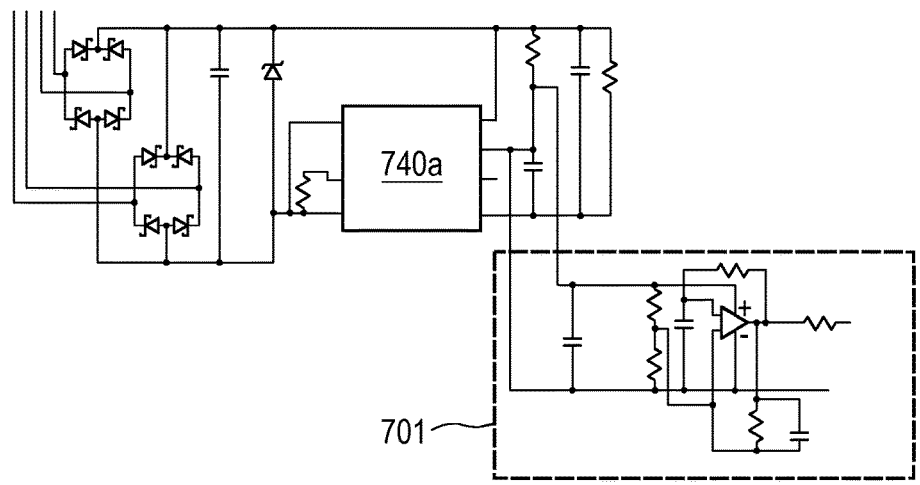
FIG. 7 shows an embodiment of an internal powering detector and a capacitive coupling driver.

An exemplary realization of power switching units 350*a*, 350*b*, $550a_1$, $550a_2$ is illustrated by FIGS. 6 and 7. The power switching units can be realized in multiple ways. As one choice, a relay (such as, e.g., a Single Pole Single Throw, SPST, or a Double Pole Single Throw, DPST) may be used.

As another choice, solid state switches may be employed. An example based on MOSFETs will be described in the following. In particular, a bidirectional MOSFET switch 650*a* may be used as illustrated by FIG. 6.

Since the polarity of the input signal is not guaranteed (due to the fact that the Ethernet cables may be crossed cables), an activation signal may require level shifting. Level shifting may be achieved via, e.g., opto couplers, pulse transformers, or capacitive coupling elements. An example of a driver 701 for capacitive coupling is given in FIG. 7. At the same time, the example illustrates the usage of a power-good signal, generated by PD controller 740. PD controller 740 is an example of an integrated circuit providing a powered device control unit. Namely, PD controller chip 740*a* provides a "power good" signal. This signal is used to activate an oscillator, build around operational amplifier U3. The output signal of operational amplifier U3 is transported via capacitors C9 and C13 (cf. FIG. 6) to the bidirectional MOSFET switch.

Figure 8:
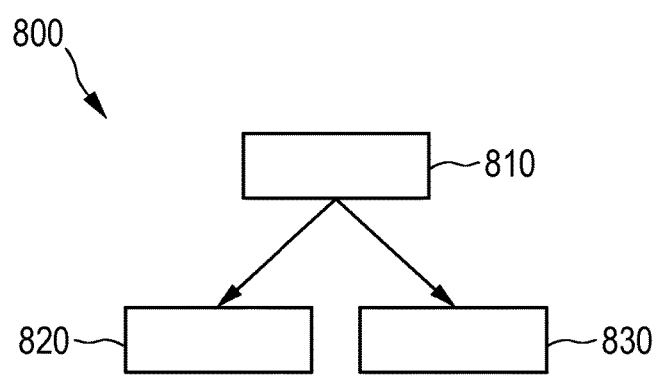
FIG. 8 shows an embodiment of a method of power forwarding via a powered device.

FIG. 8 exemplary illustrates an embodiment of a method 800 of power forwarding via a powered device 331a, 331b, 531a in a Power-over-Ethernet network where power is supplied through network connections 321, 321a, 321b, 521$a_1$, 521$a_2$. In a first step 810, power is received via a first port of said powered device 331a, 331b, 531a. Next, in a first mode, method 800 comprises a step 820 of enabling power forwarding via a second port of said second powered device 331a, 331b, 531a. However, in a second mode, method 800 comprises a step 830 of disabling power forwarding via said second port.

An example application of the invention is in PoE lighting systems installed in office buildings. In particular, the present invention may be used for powering lots of (relatively low power) lamps. Further, the present invention may be used for powering sensors in close vicinity of a luminaire.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates to a powered device with two interfacing connections. The powered device comprises power switching units for forwarding the data signal as well as the power received on the input to the output. Forwarding may be based on a detection of the powering state of the PD. In another embodiment, the Power-over-Ethernet input/output ports function bi-directionally, thereby allowing the user to daisy-chain devices in any direction. As power switching units, relays or solid-state power switches may be used.

The invention claimed is:

1. A powered device for use in a Power-over-Ethernet network where power is supplied through network connections, said powered device comprising:
    a first port;
    a second port; and
    a power switching unit configured to enable power forwarding via said second port in a first mode, and to disable power forwarding via said second port in a second mode;
    characterized in that said powered device is configured to detect whether the first port receives power directly from a power sourcing equipment of said Power-over-Ethernet network or alternatively via a second powered device based on whether said first port receives power without prior negotiation.

2. The powered device as defined in claim 1, wherein said power switching unit is configured to enable power forwarding only after said powered device is powered.

3. The powered device as defined in claim 1, wherein said powered device is configured to increase its power consumption with a slew rate that is lower than or equal to a predefined maximal slew rate if said powered device detects that the first port receives power from the second powered device.

4. The powered device as defined in claim 1, wherein said first port is configured to receive power from the power sourcing equipment, wherein said second port is configured to forward power to a subsequent powered device for use in said Power-over-Ethernet network.

5. The powered device as defined in claim 1, wherein said first port is configured to receive power via four pairs of a cable from a group comprising category 5 cables and category 6 cables.

6. The powered device as defined in claim 1, wherein said powered device comprises first and second power bypass units, wherein said first power bypass unit is passive, and wherein said second power bypass unit comprises said power switching unit.

7. The powered device as defined in claim 1, wherein said first port is configured to receive power via two pairs of a cable from a group comprising category 5 cables and category 6 cables, and wherein said second port is configured to receive power via two pairs of an Ethernet cable.

8. The powered device as defined in claim 1, wherein said powered device comprises first and second power bypass units, wherein said first power bypass unit comprises said power switching unit, and wherein said second power bypass unit comprises a second power switching unit.

9. The powered device as defined in claim 1, wherein said power switching unit comprises a Single Pole Single Throw relay unit and/or a Double Pole Single Throw relay unit, and/or
    wherein said power switching unit comprises a solid state switch, and/or
    wherein said solid state switch comprises a MOSFET.

10. A Power-over-Ethernet network system, where power is supplied through network connections, said Power-over-Ethernet network system comprising:
    a power sourcing equipment;
    first and second powered devices, wherein said first and second power devices are powered devices according to claim 1,
    wherein an output of said power sourcing equipment is coupled to said first port of said first powered device, and wherein said second port of said first powered device is coupled to said first port of said second powered device.

11. The Power-over-Ethernet network system as defined in claim 10, wherein said Power-over-Ethernet network system comprises a detector for detecting a powering state of said first powered device.

12. The Power-over-Ethernet network system as defined in claim 11, wherein said first powered device is configured to forward power to said second powered device based on said powering state.

13. A method of power forwarding via a powered device in a Power-over-Ethernet network where power is supplied through network connections, said method comprising:
    receiving power via a first port of said powered device,
    detecting whether the first port receives power directly from a Power Sourcing Equipment of said Power-over-Ethernet network or alternatively via a further powered device based on whether said first port receives power without prior negotiation, in a first mode, enabling power forwarding via a second port of said powered device; and in a second mode, disabling power forwarding via said second port of said powered device.

14. A non-transitory computer program product comprising code means for producing the steps of claim 13 when run on a computer device.

\* \* \* \* \*